Nov. 1, 1960 L. M. HUBBY 2,958,223
AUTOMATIC IMPURITY DETECTOR
Filed April 17, 1956 2 Sheets-Sheet 1
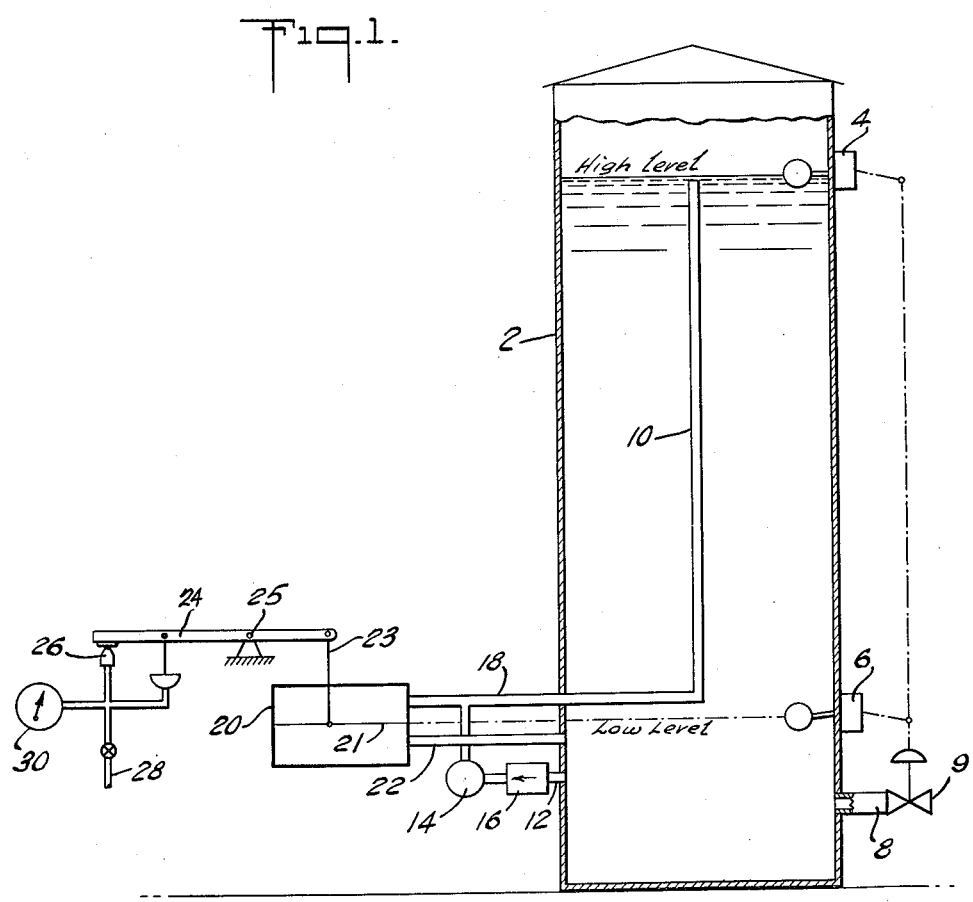

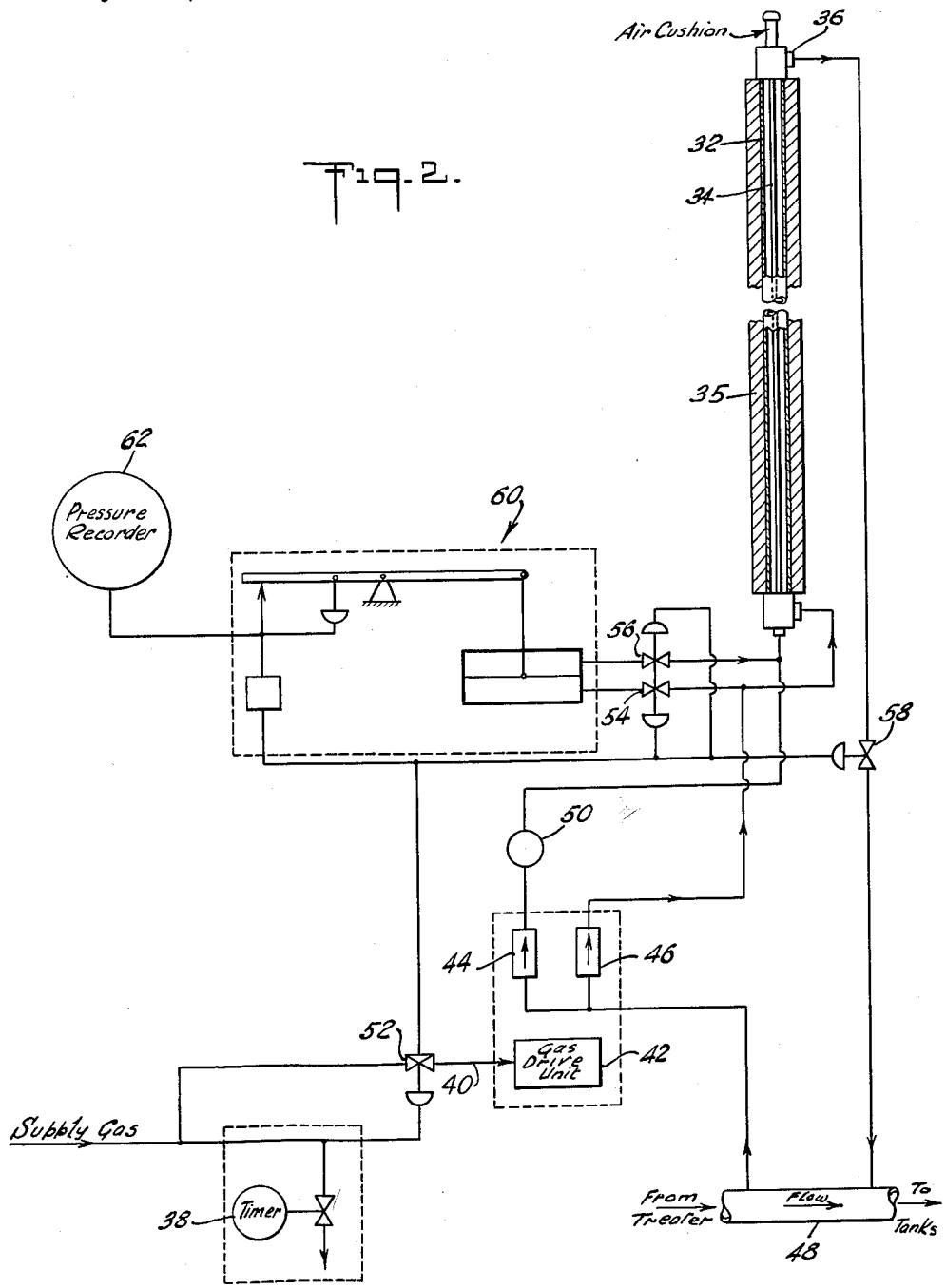

United States Patent Office 2,958,223
Patented Nov. 1, 1960

2,958,223

AUTOMATIC IMPURITY DETECTOR

Laurence M. Hubby, Bellaire, Tex., assignor to Texaco Inc., a corporation of Delaware Filed Apr. 17, 1956, Ser. No. 578,604

8 Claims. (Cl. 73—438)

This invention relates to an automatic impurity detector. More particularly, this invention relates to an automatic apparatus for detecting impurities in an oil flow or batch.

In the operation of oil leases the problem of delivering oil of a specified quality is ever present. Ordinarily, the crude oil coming from the well is subjected to a gas separator apparatus and then is sent through a treater to further rid the oil of undesirable substances, for examples, basic sediment and water. It is necessary that the oil coming from the treater be of a quality to enable it to be passed through pipelines. Substances, such as the afore-mentioned sediment and water, would tend to clog and rust metal pipelines should abnormal amounts be present.

In accordance with the present invention, an apparatus has been devised which will automatically test for impurities in an oil flow thereby enabling a constant check of its quality. If the quality is such as to warrant rejection, automatic or manual means may be employed in combination with the present device to control the treater operation or to recycle the oil for further treatment. The apparatus comprises a means to remove impurities from a portion of a liquid fluid, means to store the purified fluid, means to store at least a portion of the unpurified fluid, and means to measure a density difference between the stored fluids. The storage means are preferably columnar in shape and means to fill these storage columns to approximately equal heights are provided. The storage column for the purified fluid is, in the preferred embodiment, disposed within the unpurified fluid storage column in order to insure a more equal temperature between both fluids. The means to measure the density difference between the two fluids preferably includes differential pressure sensing means to measure the difference in pressure between equal heights of the two fluids in their respective storage columns. The means to remove impurities from the fluid is preferably a filter capable of removing water as well as solid particles. Although a filter is preferred, the invention also contemplates the use of other means such as a miniature heater-treater in which separation is accomplished by heat and gravity settling.

Further understanding of the invention will be had by reference to the accompanying drawings in which Fig. 1 is a diagrammatic representation of the automatic impurity detector in association with a measuring tank and Fig. 2 is a diagrammatic representation of a modified automatic impurity detector.

The invention as shown in Fig. 1 comprises a measuring tank 2 having a high level float control 4 and a low level control 6 associated therewith. There is a conduit 8 at the bottom of the measuring tank 2 through which the oil is delivered to, and through which the oil is removed from the tank. Within the tank 2 there is a vertical stand pipe 10 larger than capillary size, preferably about ¼ of an inch in diameter which extends upwardly to a height slightly below that of the high liquid level mark controlled by float control 4. The top of standpipe 10 is located slightly below, preferably about ¼ of an inch, the high liquid mark in order to insure equalization of the effective heights of both columns, and the standpipe 10 is positioned within the tank 2 so that the temperature of the fluids in both containers will be substantially equalized. Leading from tank 2 at about the level of the low level float 6 is a small line 12 larger than capillary size, which is used to conduct the oil in the tank through a filter 14 by means of pump 16. The filter 14 can be any type which will remove both water and solids, such as the commercially available Fram 2 Stage Oil-Water Separator. From filter 14 line 18 conducts the purified oil into the standpipe 10.

Oil which has been treated to rid it of impurities, such as basic sediment and water and which is thereafter usually stored in a lease tank (not shown) enters the tank 2 through conduit 8 and proceeds to fill said tank until high level float control 4 causes valve 9 to be closed preventing further entry of the oil. As the oil is filling tank 2, pump 16 is constantly pumping a small amount of the oil through filter 14 to remove substantially all remaining impurities, for example, sediment and water which remain in the stock oil. This purified oil then proceeds to fill up the standpipe 10. The rate of flow to fill standpipe 10 is such that it will be filled with oil from the batch being measured about when tank 2 is filled, however, any of the filtered oil which may overflow the standpipe 10 before the tank 2 is filled is not of sufficient quantity to affect the quality of the oil in gauge tank 2 when it is full. When the tank is full, standpipe 10 will be filled with filtered oil and oil in the tank will cover the top of standpipe 10. Float control 4 will then signal the pump 16 to stop and valve 9 to close.

Tube 18 leads from the bottom of the standpipe 10 to the upper half of the differential pressure cell 20 which has a sealed flexible membrane or diaphragm 21 dividing the upper and lower portions thereof. The weight of the filtered oil in the standpipe will cause an increased pressure in tube 18 which will in turn affect the upper half of the differential pressure cell 20. Directly beneath the tube 18 is a similar tube 22 leading from tank 2 to the lower half of the differential pressure cell 20. The weight of the oil in the tank will cause an increase in pressure in tube 22 which will affect the lower half of the differential pressure cell 20. Differential pressure cell 20 is positioned so that diaphragm 21 is in the same horizontal plane as the low fluid level in the tank, consequently the pressure on the lower side of the diaphragm 21 will be due to the unfiltered oil between the high and low levels in the tank. The difference in pressure on the upper and lower sides of diaphragm 21 under static conditions is due to differences in the column of oil in the standpipe 10 and the column of oil in the tank, from the level of the diaphragm up to the standpipe. Any oil above the top of the standpipe will affect both columns equally, hence is not a factor in the pressure difference on the diaphragm 21. Likewise, since both columns contain the same oil, except for impurities, and are at the same temperature, because the standpipe is immersed in the tank oil, any differential pressure on diaphragm 21 must be due to impurities in the unfiltered oil.

An arm 23 is rigidly secured to diaphragm 21 and extends through a sealed fitting in cell 20 to lever 24 having pivot 25. Any slight movement of lever 24 caused by change in pressure in either part of cell 20 will effect a further opening or closing of bleed valve 26. This in turn will regulate the amount of gas coming through line 28 to pressure recording instrument 30. Such differential pressure transmitters and recorders are well known in the art and no further explanation thereof is needed. Other means including mechanical and electrical may be employed to measure the density difference of two fluids, however, the above described device is preferred in accordance with this invention.

The means for cyclic operation of the device either automatic or semiautomatic will be well understood by those familiar with the art, therefore, no further explanation has been included under this modification.

The filter 14 is of the utmost importance in the operation of the present invention. It has a relatively small capacity since it is only necessary to fill a small volume container, however, the filter must be capable of operating a week or more at a time on a small stream of oil without attention and must remove substantially all sediment and water. The preferred type of filter comprises a two-stage purifier. The first stage is a coalescing section of porous plastic which brings about the formation of larger drops of water. The second section is a separator made up of oil-treated paper or fiber sections which separate the water from the oil passing through. The outlet from the separator is an oil-permeable, water-impermeable membrane which rejects most of the remaining water in the oil stream. A filter of this type will purify crude oil containing 1.0 percent of water to a purity of less than 0.01 percent water content when properly operated. Water presents the biggest removal problem, however, substantially all sediment or other foreign particles present are filtered out when passed through the above type filter. A filter which will meet these qualifications is the commercially available "Fram" 2 Stage Oil-Water Separator. Although a filter is much preferred, a miniature heater-treater in which separation is accomplished by heat and gravity settling, is also applicable.

The form of the invention just described and shown in Fig. 1 is designed to be used to measure the impurity of oil out of tankage and prior to sale. The tank 2 can be of any capacity. Regardless of capacity, very little oil (about 2 quarts) would be used in testing each batch.

A modification of the invention is shown in Fig. 2 in which a relatively smaller capacity column 32 is used to store the unfiltered oil for comparison instead of a tank. This form of the invention is designed for checking the purity of oil flowing in a pipeline. It operates to measure impurities and also signal for the control of treatment of the oil for reduction of impurity to meet pipeline specifications.

Column 32 is, in the preferred form a pipe having a length of about 25 feet and a diameter of about ¾ of an inch. Within column 32 is standpipe 34 which, in the preferred form, is a ⅛ inch diameter tube extending to slightly below outlet 36 in column 32. Insulating means 35 surrounds the column 32 to prevent excessive loss of heat. In this form of the invention, a time control device 38 permits gas under pressure coming through line 40 to power a gas motor 42 for a certain time period, preferably about 12 minutes. The gas motor in turn drives pumps 44 and 46. Pump 44 delivers oil directly from pipeline 48, coming from the treater (not shown) through a filter 50 to standpipe 34. Filter 50 is similar to filter 14 of the previously described modification. Pump 46 delivers unfiltered oil directly from pipeline 48 to column 32. Filter 50 should be able to filter a sufficient volume of oil to fill standpipe 34 at about the same time that column 32 is filled in order to maintain a proper cycle.

After about 12 minutes the time control device 38 stops the flow of supply gas to gas motor 42 for a short time, preferably about 3 minutes, by causing three-way valve 52 to turn, thereby stopping pumps 44 and 46. When three-way valve 52 is turned, supply gas proceeds to diaphragm controlled valves 54, 56, and 58 and to the differential pressure transmitter broadly designated as 60. Valves 54 and 56 are opened and valve 58 is closed by the gas under pressure. This allows the differential pressure transmitter 60 to transmit the difference in static head pressure between the clean filtered oil in tube 34 and the wet, sedimental oil in column 32 to the pressure recorder 62.

The differential pressure transmitter 60 is similar to that shown in Fig. 1 and will be easily understood by those skilled in the art without further explanation.

After the gas motor has been stopped for the required length of time during which the differential pressure is measured, the time control device 38 again allows supply gas to turn valve 52 permitting gas to propel motor 42 to power pumps 44 and 46 which in turn move filtered and unfiltered oil through column 32 and standpipe 34 flushing them, through outlet 36, of the original oil batches. The cycle will then be complete allowing a new determination of the impurities of the oil flowing from the treater or other purifying means.

As can be seen this latter modification requires much less time to make a purity determination than the former and for this reason is preferred for testing the purity of oil in a pipeline.

Obviously, many modifications and variations of the invention, as hereinbefore set forth, may be made without departing from the spirit and scope thereof and, therefore, only such limitations should be imposed as are indicated in the appended claims.

I claim:

1. The cyclic method of measuring the basic sediment and water content of a crude mineral oil during the custody transfer thereof, which comprises storing at least a portion of said mineral oil in a vertical column, withdrawing a still smaller portion of said mineral oil and subjecting the same to treatment to remove basic sediment and water, passing the treated portion into a vertical column of smaller cross-sectional area than said first mentioned vertical column and disposed in indirect heat exchange relationship within the untreated oil therein, the treated stream discharging from the top of said smaller column into the untreated oil in said first mentioned vertical column, discontinuing the supply of oil to both columns when the liquid level in said first mentioned column is slightly higher than the top of said smaller column, measuring the pressure differential existing between the oils in the vertical columns at approximately the same depth and approximately the same temperature due to the heat exchange therebetween, then discharging the oils from both columns and repeating the process.

2. The cyclic method of measuring the basic sediment and water content of a crude mineral oil during the custody transfer thereof, which comprises pumping the crude oil into a tank, simultaneously withdrawing a small stream of the crude oil from the tank and subjecting the same to treatment to remove basic sediment and water, passing the treated stream into a vertical column of small cross-sectional area disposed in indirect heat exchange realtionship within the untreated oil in the tank, the treated stream discharging from the top of the column into the oil within the tank, discontinuing the supply of crude oil to the tank when the liquid level therein is slightly higher than the height of the discharge of the vertical treated stream column and simultaneously discontinuing withdrawing said small stream of crude oil from the tank, measuring the pressure differential existing between the vertical column of treated oil and the column of crude oil within the tank at approximately the same depth and approximately the same temperature due to the heat exchange therebetween, then discharging the oil from the tank and repeating the process.

3. The cyclic method of measuring the basic sediment and water content of crude oil flowing through a pipeline, which comprises withdrawing two small streams from the crude oil passing through the pipeline, directing one stream into a vertical outer column of substantial height from which the oil overflows and is returned to the pipeline, subjecting the other stream to filtering to remove basic sediment and water, directing said filtered stream into a separate vertical column disposed in indirect heat exchange relationship within said outer column, said inner column discharging at the top thereof into said outer column slightly below the level of said overflow, discontinuing the withdrawal of said streams from the pipeline when the oil in said outer column reaches the point of overflow, measuring the pressure differential existing between the vertical column of filtered oil and the column of unfiltered oil at approximately the same depth and approximately the same temperature due to the heat exchange therebetween, and then repeating the process.

4. An apparatus for periodically determining impurities in a fluid stream comprising means to detour fluid to be tested from said stream, cyclic time control means for said fluid detour means, means to remove impurities from a portion of said fluid, a storage column for said fluid to be tested, a storage column for the purified fluid, means to fill said storage columns to equal effective heights, means to create a static condition in said columns, and means for measuring the hydrostatic pressure differential between said columns of fluid.

5. An apparatus for periodically determining impurities in a fluid stream comprising means to detour fluid to be tested from said stream, fluid impurity removing means, a storage column for purified fluid, a storage column for unpurified fluid, pump means for moving a portion of said detoured fluid through said impurity removing means and into said storage column for purified fluid, pump means for moving detoured fluid directly to said storage column for unpurified liquid, cyclic time control means for said pumps, means to fill said storage columns to equal effective heights, means to create a static condition in said columns, and means for measuring the hydrostatic presure differential between said columns of fluid.

6. An apparatus as described in claim 5 wherein said storage column for purified fluid is disposed within said solumn for the fluid to be tested to effect temperature equalization by heat exchange between the two fluid columns.

7. An apparatus for periodically determining impurities in a body of fluid comprising means to sample fluid to be tested from said body of fluid, cyclic control means for said fluid sampling means, means to remove impurities from a portion of said fluid, a storage column for the fluid to be tested, a storage column for the purified fluid, means to fill said storage columns to equal effective heights, means to create a static condition in said columns, and means for measuring the hydrostatic presure differential between said columns of fluid.

8. An apparatus according to claim 7 wherein said storage column for purified fluid is disposed within said column for the fluid to be tested to effect temperature equalization by heat exchange between the two fluid columns.

References Cited in the file of this patent
UNITED STATES PATENTS

| | | |
|---|---|---|
| 1,298,810 | Sowden | Apr. 1, 1919 |
| 1,410,836 | Porter | Mar. 28, 1922 |
| 1,888,577 | Stephans et al. | Nov. 22, 1932 |
| 1,942,859 | Hickman | Jan. 9, 1934 |
| 2,166,904 | Gray | July 18, 1939 |
| 2,279,254 | Irwin | Apr. 7, 1942 |
| 2,758,477 | Haeber | Aug. 14, 1956 |
| 2,851,016 | Kinderman | Sept. 9, 1958 |